United States Patent
Shiba et al.

(10) Patent No.: US 7,813,443 B2
(45) Date of Patent: Oct. 12, 2010

(54) TRANSMIT DIVERSITY SYSTEM AND METHOD

(75) Inventors: Michael Shiba, San Jose, CA (US); Wayne Ouchida, Mountain View, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 991 days.

(21) Appl. No.: 11/405,240

(22) Filed: Apr. 17, 2006

(65) Prior Publication Data
US 2007/0242759 A1 Oct. 18, 2007

(51) Int. Cl.
H03K 7/10 (2006.01)
H03C 5/00 (2006.01)
H03D 5/00 (2006.01)
H03K 9/10 (2006.01)

(52) U.S. Cl. .................. 375/269; 375/260; 375/267; 375/299; 375/347

(58) Field of Classification Search ............. 375/269, 375/299, 260, 267, 347
See application file for complete search history.

(56) References Cited

U.S. PATENT DOCUMENTS

| | | | |
|---|---|---|---|
| 7,000,021 B1 * | 2/2006 | Radhakrishnan et al. | 709/230 |
| 7,397,864 B2 * | 7/2008 | Tarokh et al. | 375/299 |
| 2003/0003937 A1 * | 1/2003 | Ohkubo et al. | 455/517 |
| 2006/0039299 A1 * | 2/2006 | Ihm et al. | 370/254 |

* cited by examiner

Primary Examiner—Ted M Wang
(74) Attorney, Agent, or Firm—Thorne & Halajian, LLP

(57) ABSTRACT

A transmitter including a plurality of transmitting antennas and a processor operably coupled to the plurality of transmitting antennas. The processor is configured to select a first antenna from the plurality of transmitting antennas for transmission of a frame of data, determine if the frame is successfully received by a receiver, and select a second antenna different than the first antenna from the plurality of transmitting antennas for retransmission of the frame if it is determined that the frame was not successfully received by the receiver. The processor is configured to select a different antenna than a previous antenna for retransmission of the frame each time it is determined that the frame was not successfully received by the receiver. The processor is configured to discard the frame from further transmission if it is determined that the frame was not successfully received by the receiver after a number of transmission attempts.

18 Claims, 3 Drawing Sheets

| TRANSMIT WINDOW | FRAME | ATTEMPT | ANT | RESULT |
| --- | --- | --- | --- | --- |
| 1 | 1 | 1 | A | FAIL - USE ANTENNA "B" FOR RETRY |
| 2 | 2 | 1 | A | PASS |
| 3 | 3 | 1 | A | FAIL - USE ANTENNA "B" FOR RETRY |
| 4 | 1 | 2 | B | PASS - NOTE: OPPOSITE ANTENNA USED |
| 5 | 4 | 1 | B | FAIL - USE ANTENNA "A" FOR RETRY |
| 6 | 4 | 2 | A | FAIL - USE ANTENNA "B" FOR RETRY |
| 7 | 3 | 2 | B | FAIL - USE ANTENNA "A" FOR RETRY |
| 8 | 5 | 1 | B | PASS |
| 9 | 4 | 3 | B | PASS - NOTE: ANTENNA DID NOT HAVE TO SWITCH TO ENSURE "B" WAS USED |
| 10 | 3 | 3 | A | FAIL - USE ANTENNA "B" FOR RETRY |
| 11 | 3 | 4 | B | FAIL - USE ANTENNA "A" FOR RETRY |
| 12 | 3 | 5 | A | PASS |

FIG. 3

TRANSMIT DIVERSITY SYSTEM AND METHOD

FIELD OF THE INVENTION

The present system relates to wireless transmitting stations that have two or more transmitting antennas.

BACKGROUND OF THE INVENTION

Wireless transmissions are typically packetized and transmitted as a series of related blocks, termed frames of data during available transmission windows. These frames of data are received at a receiver and are reassembled to form a coherent data stream. A problem exists in wireless systems in that sometimes a frame of data is transmitted at a transmitter but is never received or is corrupted before receipt at the receiver. To overcome this shortcoming, wireless systems typically have a system for the transmitter to determine that a given frame of data is received by the receiver. For example, in the IEEE 802.11 wireless standard, a transmitter after transmitting a frame awaits receipt of an acknowledgement transmission from the receiver to determine that the frame was successfully received by the receiver. In a case wherein an acknowledgement is not received for a given frame within a given amount of time, the transmitter will retransmit the frame during a next available transmission window. The retransmission may occur several times for a given frame when an acknowledgement indicating receipt of the given frame is not received by the transmitter. After some given number of transmission attempts, the transmitter will eventually discard the unsuccessfully transmitted frame and will no longer attempt retransmission. For certain types of data transmissions, such as a transmission of program instructions, loss of even a single frame of data may have an effect of rendering even successfully transmitted frames useless. Even in a case wherein the entire transmission is not rendered useless when a frame is lost, such as for voice transmissions, loss of voice frames reduces the perceived quality of the overall transmission and therefore is undesirable.

To increase the likelihood of a successful transmission, some transmitters have two or more transmitting antennas. However, wireless transmitters that have two or more transmitting antennas oftentimes still have trouble transmitting successfully on any one of the transmitting antennas. Systems exist that try to determine which antenna has a greater likelihood of transmitting successfully and then utilize this antenna for a given frame transmission. However, the conditions that determine which antenna is better for transmission may change rapidly and repeatedly, even within a span of microseconds. When a given frame is repeatedly retransmitted over a wrong antenna (e.g., an antenna that can not transmit successfully to a given receiver), the given frame may be eventually discarded. Accordingly, determining a most appropriate antenna for transmission may not always be sufficient.

It is an object of the present system to overcome disadvantages and/or make improvements in the prior art.

SUMMARY OF THE INVENTION

The present system includes a device and a method of operating a transmitter to transmit a frame of data to a receiver. The method includes the acts of selecting a first antenna from a plurality of transmitting antennas for transmission of the frame of data, determining if the frame of data is successfully received by the receiver, and selecting a second antenna from the plurality of transmitting antennas that is different than the first antenna, for retransmission of the frame of data if it is determined that the frame of data was not successfully received by the receiver. In one embodiment, the act of selecting a second antenna includes selecting a different antenna than an antenna used immediately previously for the frame to retransmit the frame each time it is determined that the frame was not successfully received by the receiver from the immediately previous antenna.

In a further embodiment, the method may include discarding the frame of data from further transmission if it is determined that the frame of data was not successfully received by the receiver after a number of transmission attempts. The method may include the acts of determining a type of data contained in the frame of data, and determining the number of transmission attempts based on the type of data. In a same or further embodiment, the method may include the act of awaiting receipt of an acknowledgement from the receiver to determine if the frame of data is successfully received by the receiver.

BRIEF DESCRIPTION OF THE DRAWINGS

The following are descriptions of illustrative embodiments that when taken in conjunction with the following drawings will demonstrate the above noted features and advantages, as well as further ones. In the following description, for purposes of explanation rather than limitation, specific details are set forth such as architecture, interfaces, techniques, etc., for illustration. However, it will be apparent to those of ordinary skill in the art that other embodiments that depart from these details would still be understood to be within the scope of the appended claims. Moreover, for the purpose of clarity, detailed descriptions of well-known devices, circuits, and methods are omitted so as not to obscure the description of the present system.

It should be expressly understood that the drawings are included for illustrative purposes and do not represent the scope of the present system in which:

FIG. 3 shows a table illustrating operation in accordance with an embodiment of the present system.

DETAILED DESCRIPTION OF THE INVENTION

Figure 1:
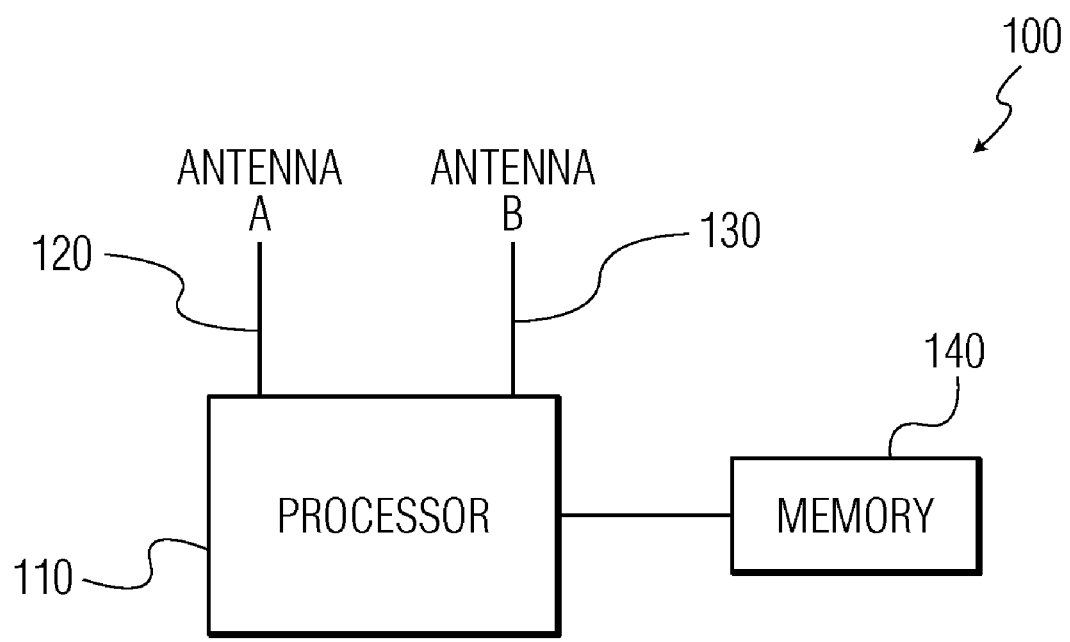
FIG. 1 shows an illustrative system in accordance with an embodiment of the present system.

FIG. 1 shows an illustrative system 100 in accordance with an embodiment of the present system. The system 100 includes a processor 110 operationally coupled to computer readable medium illustrated as a memory 140 and transmit/receive antennas 120, 130, illustratively identified as antenna A, antenna B. As is known in the art, the methods and apparatus discussed herein may be distributed as an article of manufacture that itself comprises the memory 140 having computer-readable code embodied thereon. The computer-readable code is operable, in conjunction with the processor 110, to carry out all or some of the acts to perform the methods or create the apparatus discussed herein. The memory 140 may be a recordable medium (e.g., floppy disks, hard drives, DVD, solid state memory, memory cards, etc.) or may be a transmission medium (e.g., a network comprising fiber-optics, the world-wide web, cables, or a wireless channel using time-division multiple access, code-division multiple access, or other radio-frequency channel). Any medium known or developed that can store and/or provide information suitable for use with the system 100 may be used. The computer-readable code is any mechanism for allowing the processor 110 to read and write instructions and data, such as magnetic variations on a magnetic medium or height/light deflecting variations on the surface of a compact disk.

The memory 140 may be long-term, short-term, or a combination of long and short term memories. The memory 140 configures the processor 110 to implement the methods, acts, and functions disclosed herein. The memory 140 may be distributed or local and the processor 110 may be distributed or singular. The memory 140 may be implemented as electrical, magnetic or optical memory, or any combination of these or other types of storage devices. Moreover, the term "memory" should be construed broadly enough to encompass any information able to be read from or written to an address in an addressable space accessible by the processor 110. With this definition, information on a network is still within the memory 140 since the processor 110 may retrieve/write the information from/to the network. It should also be noted that some or all of operations described herein may be incorporated into an application-specific or general-use integrated circuit including the operation of the processor 110 and the memory 140.

Further, the processor 110 may be a dedicated processor for performing in accordance with the present system or may be a general-purpose processor wherein only one of many functions operates for performing in accordance with the present system. The processor 110 may operate utilizing a program portion, multiple program segments, or may be a hardware device utilizing a dedicated or multi-purpose integrated circuit.

Figure 2:
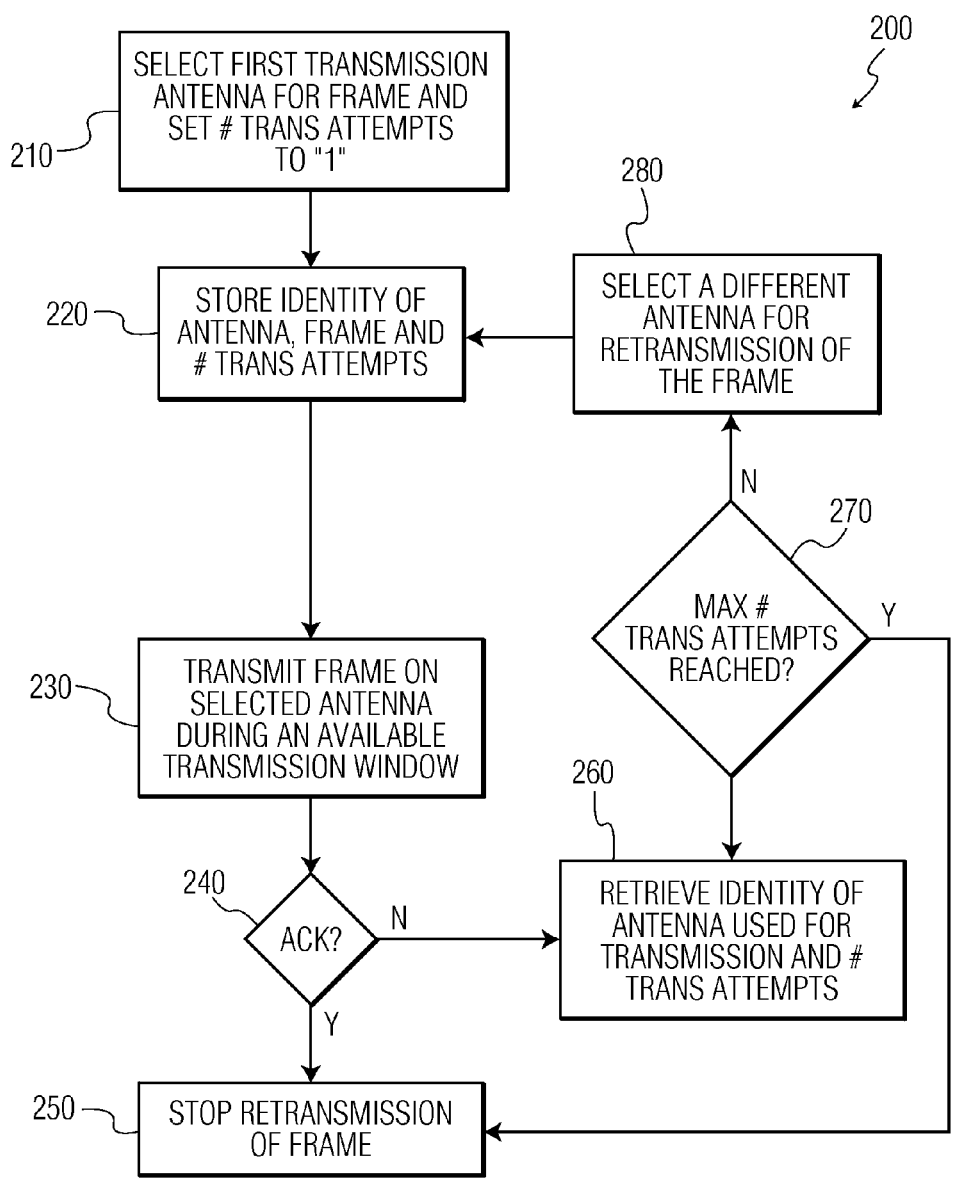
FIG. 2 shows a flow diagram illustrating an operation in accordance with an embodiment of the present system.

Further operation of the present system will be presented in conjunction with FIG. 2 which shows a flow diagram 200 illustrating an operation in accordance with an embodiment of the present system. In accordance with the present system, the processor 110 may receive data frames for transmission from the memory 140 (e.g., a portion of the memory may reside on a network) or from another source (not shown) and makes a determination of which antenna to use for a first transmission during act 210. The method utilized by the processor 110 for making a determination as to which antenna to first use for transmission of a given frame is generally beyond the scope of the present system. Any system for selecting a first transmitting antenna that is known or developed may be suitably utilized. During act 210, the number (#) of transmission attempts for a given frame may be also set equal to one. After a first transmitting antenna is selected, the processor 110 stores data, such as in the memory 140, identifying the antenna selected, identifying the frame, and identifying the number of transmission attempts for the frame during act 220.

The processor 110 during act 230 transmits the frame (e.g., frame 1) on the selected antenna during an available transmission window. Other frames may be transmitted during other transmission windows using the same or another system for determining transmitting antennas. The processor 110 determines whether frame 1 was successfully received during act 240. The time period that the processor 110 waits for receipt of an acknowledgment and the system of acknowledgement may be suitably adapted to comply with any transmission system and/or medium. For a transmission medium, such as a transmission medium that complies with the IEEE 802.11 standard, the determination as to whether a frame is successfully received is made based on whether an acknowledgement is received back from an intended receiving system. Other known or developed systems for making this determination may be suitably utilized in accordance with the present system as long as the system 100, and thereby the processor 110, has some way of determining that a transmitted frame is received by the intended receiving system.

In a case wherein an acknowledgment is received for a given frame, the processor 110 stops retransmission of the successfully transmitted frame during act 250. Act 250 may also include a deletion of the identity of the frame, the identity of the selected antenna, and/or the number of transmission attempts from the memory 140, or simply a release for further use of the memory location in which the identity of the frame, the identity of the selected antenna, and/or the number of transmission attempts is stored.

In a case wherein an acknowledgment is not received for a given frame, the processor 110 during act 260 retrieves the identity of the antenna used for transmission of the frame and the number of transmission attempts for the frame. During act 270, the processor 110 determines whether the maximum number of transmission attempts has been reached. The maximum number of transmission attempts for a given frame may be suitably adapted for a given transmission system and/or medium and may change based on the type of data contained in the frame or may be predetermined. In an embodiment wherein the maximum number of transmission attempts is adapted to the type of data in a frame, a program portion, for example, contained in a frame may be assigned a greater number of transmission attempts than for example, a voice portion contained in a frame. As would be readily apparent to a person of ordinary skill in the art, other adaptations to the maximum number of transmission attempts may also be suitably applied. In one embodiment, the maximum number of transmission attempts for a given frame may also be stored during act 220 (see discussion above regarding act 220). In any event, in a case wherein the maximum number of transmission attempts has been reached, the processor 110 will stop retransmission attempts of the frame during act 250.

In a case wherein the maximum number of transmission attempts has not been reached as determined during act 270, then during act 280 the processor selects a different antenna for retransmission of the frame. The different antenna may be simply a different antenna than the previous transmission attempt for the frame (e.g., any other available antenna) or, in a case wherein more than two antennas are available to the system, the different antenna may be selected using a system similar to how a first transmission antenna may be selected. In any event, the selected antenna for retransmission of a given frame is not the antenna that was previously utilized for the immediately previous transmission attempt of the given frame. Following act 280, the identity of the antenna selected, the frame, the number of transmission attempts for the frame, and/or the maximum number of transmission attempts is stored during act 220 and the process of attempting to transmit the frame may be repeated as before.

The system utilized for selecting a different antenna for retransmission may be flexibly adapted to accommodate any number of available antennas for retransmission. Although only antennas 120, 130 are illustratively shown, other numbers of antennas may be suitably utilized and any system for selecting a different antenna may be adopted in accordance with the present system. In a system with more than two available antennas, the processor 110 during act 220 may maintain a list of each antenna previously used to facilitate a selection of a next antenna. For example, in a three antenna system, the processor 110 may maintain a list of the last two antennas used to ensure, if desired, that each antenna is utilized in a series of attempted retransmissions. In this embodiment, the sequence of selecting antennas may be simply sequential (e.g., A->B->C, etc.), with the starting antenna selected by any known or developed system. In a further embodiment, the next antenna may also be selected utilizing any know or developed system. In other words, the antenna selected for retransmission need not be sequentially selected.

In a two antenna system as illustratively shown in FIG. 1, if an initial attempt to transmit a given frame fails on one antenna (e.g., antenna A) as determined during act 240, if/when another transmission attempt is initiated for the given frame, the other antenna (e.g., antenna B) is utilized. Once again, the antenna utilized is recorded during act 220 so that if this transmission attempt also fails, the next transmission attempt will use the antenna utilized for the first transmission attempt (e.g., return to antenna A). As long as transmission attempts fail for the given frame, and until the frame is discarded, each transmission attempt will use a different antenna than the immediately previous attempt for the given frame.

As should be clear from the above illustrative description of the present system, the present system does not necessarily depend on any particular scheduling algorithm for frames, as interleaved transmissions of other frames need not affect the antenna to be used for retransmission of a given frame. In one embodiment, each frame is treated independently, with a decision on an appropriate antenna being made just prior to transmission of the frame regardless of a transmission decision made on another frame. In this embodiment, for a given frame, each transmission attempt utilizes a different antenna than the immediately previous attempt. Transmission of other frames and/or antenna switches made to accommodate these other frames has no bearing on the antenna used for the next attempt of the given frame.

FIG. 3 shows a table illustrating operation in accordance with an embodiment of the present system. Illustratively, in a first transmission window, the processor makes a first attempt to transmit frame 1 utilizing antenna A but fails to transmit successfully (e.g., no acknowledgement of transmission of frame 1 is received). The processor determines to use antenna B for a retransmission of frame 1 when a transmit window is available. During transmit window 2, the processor makes a first attempt to transmit frame 2 utilizing antenna A and transmits successfully. Accordingly, no retransmission of frame 2 need be attempted. During transmit window 3, the processor makes a first attempt to transmit frame 3 utilizing antenna A but fails to transmit successfully. The processor determines to use antenna B for a retransmission of frame 3 when a transmit window is available. During transmit window 4, the processor makes a second attempt to transmit frame 1, this attempt utilizing antenna B, and transmits successfully. Accordingly, no further retransmission of frame 1 need be attempted. During transmit window 5, the processor makes a first attempt to transmit frame 4 utilizing antenna B but fails to transmit successfully. The processor determines to use antenna A for a retransmission of frame 4 when a transmit window is available. During transmit window 6, the processor makes a second attempt to transmit frame 4, this attempt utilizing antenna A, but fails to transmit successfully. The processor determines to use antenna B for the next retransmission of frame 4 when a transmit window is available. During transmit window 7, the processor makes a second attempt to transmit frame 3, this attempt utilizing antenna B, but fails to transmit successfully. The processor determines to use antenna A for the next retransmission of frame 3 when a transmit window is available. During transmit window 8, the processor makes a first attempt to transmit frame 5 utilizing antenna B and transmits successfully. Accordingly, no retransmission of frame 5 need be attempted. During transmit window 9, the processor makes a third attempt to transmit frame 4, this attempt utilizing antenna B, and transmits successfully. Accordingly, no retransmission of frame 4 need be attempted. During transmit window 10, the processor makes a third attempt to transmit frame 3, this attempt utilizing antenna A, but fails to transmit successfully. The processor determines to use antenna B for the next retransmission of frame 3 when a transmit window is available. During transmit window 11, the processor makes a fourth attempt to transmit frame 3, this attempt utilizing antenna B, but fails to transmit successfully. The processor determines to use antenna A for the next retransmission of frame 3 when a transmit window is available. During transmit window 12, the processor makes a fifth attempt to transmit frame 3 utilizing antenna A and transmits successfully. Accordingly, no retransmission of frame 3 need be attempted.

In this embodiment, each frame is transmitted independent of each other frame. In other words, a determination to utilize a given antenna for a given frame need have no effect on the determination made for another frame. However, in another embodiment, an antenna selected for a first transmission attempt of a given frame, may be selected by determining which antenna was last successfully utilized for another frame.

Of course, it is to be appreciated that any one of the above embodiments or processes may be combined with one or more other embodiments or processes in accordance with the present system. As should be clear from the discussion herein, the present system overcomes disadvantages and/or makes improvements over other systems. Further, the present system may improve the chances for successful delivery of frames in marginal signal conditions. The present system may prove helpful for frames that contain voice data since these frames may not be attempted many times before being discarded.

Finally, the above-discussion is intended to be merely illustrative of the present system and should not be construed as limiting the appended claims to any particular embodiment or group of embodiments. Thus, while the present system has been described with reference to exemplary embodiments, it should also be appreciated that numerous modifications and alternative embodiments may be devised by those having ordinary skill in the art without departing from the broader and intended spirit and scope of the present system as set forth in the claims that follow. In addition, the section headings included herein are intended to facilitate a review but are not intended to limit the scope of the present system. Accordingly, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise; and h) no specific sequence of acts or steps is intended to be required unless specifically indicated.

The claimed invention is:

1. A transmitter comprising:
   a plurality of transmitting antennas;
   a processor operably coupled to the plurality of transmitting antennas, wherein the processor is configured to:
   select a first antenna from the plurality of transmitting antennas for transmission of a frame of data;
   determine if the frame is successfully received by a receiver; and
   select a second antenna different than the first antenna from the plurality of transmitting antennas for retransmission of the frame if it is determined that the frame was not successfully received by the receiver, wherein the second antenna is selected based on the second antenna being a different antenna than the first antenna; wherein the processor is configured to discard the frame from further transmission if it is determined that the frame was not successfully received by the receiver after a number of transmission attempts; wherein the number of transmission attempts is determined based on a type of data contained in the frame.

2. The transmitter of claim 1, wherein the processor is configured to select a third antenna different than the second antenna from the plurality of transmitting antennas for retransmission of the frame if it is determined that the frame was not successfully received by the receiver from the second antenna, wherein the third antenna is selected based on the third antenna being a different antenna than the second antenna.

3. The transmitter of claim 2, wherein the processor is configured to select an additional antenna than a previous antenna from the plurality of transmitting antennas for retransmission of the frame each time it is determined that the frame was not successfully received by the receiver from the previous antenna based on the additional antenna being a different antenna than the previous antenna.

4. The transmitter of claim 2, wherein the third antenna is a same antenna as the first antenna.

5. The transmitter of claim 1, wherein the transmitter is configured for operation according to the IEEE 802.11 transmission standard and wherein the processor is configured to determine if the frame is successfully received by the receiver by awaiting receipt of an acknowledgement from the receiver.

6. The transmitter of claim 1, wherein the frame is one of a plurality of frames, wherein the processor is configured to operate on each of the plurality of frames the same as it operates on the frame.

7. The transmitter of claim 6, wherein the processor is configured to operate on each of the plurality of frames independent of each other of the plurality of frames.

8. A method of operating a transmitter to transmit a frame of data to a receiver, the method comprising acts of:
   selecting a first antenna for transmission of the frame;
   determining if the frame is successfully received by the receiver; and
   selecting a second antenna different than the first antenna for retransmission of the frame if it is determined that the frame was not successfully received by the receiver, wherein the second antenna is selected based on the second antenna being a different antenna than the first antenna; discarding the frame from further transmission if it is determined that the frame was not successfully received by the receiver after a number of transmission attempts; determining a type of data contained in the frame; and determining the number of transmission attempts based on the type of data.

9. The method of claim 8, wherein the act of selecting a second antenna comprises an act of selecting an additional antenna than an antenna used immediately previously for the frame for retransmission of the frame each time it is determined that the frame was not successfully received by the receiver from the immediately previous antenna based on the additional antenna being a different antenna than the previous antenna.

10. The method of claim 8, wherein the act of determining if the frame is successfully received by the receiver comprises an act of awaiting receipt of an acknowledgement from the receiver.

11. A computer readable memory medium encoded with an application executed by a computer that configures a processor to aid in transmission of a frame of data from a transmitter to a receiver, the application comprising:
    a portion to select an antenna for transmission of the frame;
    a portion to determine if the frame is successfully received by the receiver; and
    a portion to select an additional antenna than the antenna for retransmission of the frame if it is determined that the frame was not successfully received by the receiver, wherein the alternate antenna is selected based on the additional antenna being a different antenna than the antenna; a portion configured to discard the frame from further transmission if it is determined that the frame was not successfully received by the receiver after a number of transmission attempts; a portion configured to determine a type of data contained in the frame; and a portion configured to determine the number of transmission attempts based on the type of data.

12. The computer readable memory medium of claim 11, wherein the portion to select the additional antenna is configured to select a different antenna for retransmission than an antenna used immediately previously for the frame, each time it is determined that the frame was not successfully received by the receiver from the immediately previous antenna based on the additional antenna being a different antenna than the immediately previous antenna.

13. A transmitter for transmission of a frame of data to a receiver, the transmitter comprising:
    a means for selecting an antenna for transmission of the frame;
    a means for determining if the frame is successfully received by the receiver; and
    a means for selecting an additional antenna than the antenna for retransmission of the frame if it is determined that the frame was not successfully received by the receiver, wherein the additional antenna is selected based on the additional antenna being a different antenna than the antenna; a means for discarding the frame from further transmission if it is determined that the frame was not successfully received by the receiver after a number of transmission attempts; a means for determining a type of data contained in the frame; and a means for determining the number of transmission attempts based on the type of data.

14. The transmitter of claim 13, wherein the means for selecting the additional antenna comprises a means for selecting an additional antenna than an antenna used immediately previously for the frame for retransmission of the frame each time it is determined that the frame was not successfully received by the receiver from the immediately previous antenna based on the additional antenna being a different antenna than the previous antenna.

15. A transmitter comprising:

a plurality of transmitting antennas;

a processor operably coupled to the plurality of transmitting antennas, wherein the processor is configured to:

select a first antenna from the plurality of transmitting antennas for transmission of a frame of data;

determine if the frame is successfully received by a receiver;

select a second antenna different than the first antenna from the plurality of transmitting antennas for retransmission of the frame if it is determined that the frame was not successfully received by the receiver; and discard the frame from further transmission if it is determined that the frame was not successfully received by the receiver after a number of transmission attempts, wherein the number of transmission attempts is determined based on a type of data contained in the frame.

16. A method of operating a transmitter to transmit a frame of data to a receiver, the method comprising acts of:

selecting a first antenna for transmission of the frame;

determining if the frame is successfully received by the receiver;

selecting a second antenna different than the first antenna for retransmission of the frame if it is determined that the frame was not successfully received by the receiver;

determining a type of data contained in the frame;

determining a number of transmission attempts based on the type of data; and discarding the frame from further transmission if it is determined that the frame was not successfully received by the receiver after the number of transmission attempts.

17. A computer readable memory medium encoded with an application executed by a computer that configures a processor to aid in transmission of a frame of data from a transmitter to a receiver, the application comprising:

a portion to select an antenna for transmission of the frame;

a portion to determine if the frame is successfully received by the receiver;

a portion to select an additional antenna than the antenna for retransmission of the frame if it is determined that the frame was not successfully received by the receiver;

a portion configured to determine a type of data contained in the frame;

a portion configured to determine a number of transmission attempts based on the type of data; and a portion configured to discard the frame from further transmission if it is determined that the frame was not successfully received by the receiver after the number of transmission attempts.

18. A transmitter for transmission of a frame of data to a receiver, the transmitter comprising:

a means for selecting an antenna for transmission of the frame;

a means for determining if the frame is successfully received by the receiver;

a means for selecting a different antenna than the antenna for retransmission of the frame if it is determined that the frame was not successfully received by the receiver;

a means for determining a type of data contained in the frame;

a means for determining a number of transmission attempts based on the type of data; and a means for discarding the frame from further transmission if it is determined that the frame was not successfully received by the receiver after the number of transmission attempts.

* * * * *